United States Patent [19]

Naud

[11] 3,924,242

[45] Dec. 2, 1975

[54] SYSTEM FOR BUILDING OP CODES

[75] Inventor: Royce E. Naud, Richardson, Tex.

[73] Assignee: Texas Instruments Incorporated, Dallas, Tex.

[22] Filed: Jan. 7, 1974

[21] Appl. No.: 431,590

[52] U.S. Cl. .......... 340/172.5; 340/172.5

[51] Int. Cl.$^2$ .......... G06F 3/02

[58] Field of Search .......... 340/172.5

[56] References Cited

UNITED STATES PATENTS

| | | | |
|---|---|---|---|
| 3,668,661 | 6/1972 | Cull | 340/172.5 |
| 3,699,526 | 10/1972 | Iskiyan et al. | 340/172.5 |
| 3,725,877 | 4/1973 | Kell | 340/172.5 |
| 3,781,852 | 12/1973 | White et al. | 340/172.5 X |
| 3,858,799 | 1/1975 | Yoshio et al. | 340/172.5 X |

*Primary Examiner*—Harvey E. Springborn
*Attorney, Agent, or Firm*—Harold Levine; Edward J. Connors, Jr.; Stephen S. Sadacca

[57] ABSTRACT

A system for building complex multibit OP codes from a plurality of less complex multibit OP codes generated by a plurality of sequential keyboard entries utilizes a plurality of EXCLUSIVE OR gates which add respective bits of the OP codes generated by the sequential keyboard entries. The EXCLUSIVE OR gates each have first and second inputs and an output on which the EXCLUSIVE OR function of the input is generated. Each bit of the less complex OP codes generated by the keyboard is applied to the first input of a respective one of the EXCLUSIVE OR gates and the outputs of the EXCLUSIVE OR gates are coupled to respective parallel inputs of a storage register means. The second inputs of the EXCLUSIVE OR gates are respectively coupled to the parallel outputs of the storage register means. In operation, the bits of a first input OP code generated by the keyboard is stored in the storage means. Upon generation of a second input OP code by the keyboard the bits of the second OP code at the first inputs of the EXCLUSIVE OR gates are added to the bits of the first OP code at the second inputs of the EXCLUSIVE OR gates by the EXCLUSIVE OR gates to form a complex OP code which is then stored in the storage register means.

9 Claims, 8 Drawing Figures

SYSTEM FOR BUILDING OP CODES

BACKGROUND OF THE INVENTION

This invention relates to keyboard actuated forming of OP codes used in systems such as instructions in memory in a functional sequencer. In a more specific aspect, the invention provides for reversible programming by way of a keyboard module in which a shift register stores new OP codes.

The present invention has particular utility in devices known as programmable logic controllers used in control of machines, processes, solenoids, motors, etc. Such controllers in general have a large number of output storage devices associated therewith, which devices are employed to connect power sources to machine elements or disconnect the same at times predicted upon conditions in the system and the relation of such conditions to a programmed set of instructions stored in a memory in the controller. Installations are made by guidance provided through electrical circuit diagrams in the form of ladder networks. Several attemps to solve problems encountered in simplifying installation procedures and operations are found in "Control Engineering," Sept. 1972, page 45 et seq.

In the use of systems under direction of programmable logic controllers, it frequently becomes necessary to make physical changes in the system, adding or deleting elements to be controlled. Programmed sets of instructions are stored in a memory in response to which computations or sequences in the controller are directed. At times it, therefore, becomes necessary that the instruction set must be modified by adding an instruction somewhere in the programmed set.

In U.S. Pat. application Ser. No. 431,442, filed Jan. 7, 1974 the insertion of instructions is carried out by forming OP codes through actuation of a keyboard to initially establish or later modify an instruction set without familiarity with conventional programming techniques.

In accordance with the present invention, there is provided a programming keyboard module for programming a controller by encoding instructions to be stored in a read/write memory in the controller. The keyboard module includes a keyboard and a storage register means such as an N bit parallel in-parallel out shift register. A new instruction is manually keyed into the keyboard and built in the storage register means. A memory location of the read/write memory where it is to be stored is loaded into an address counter.

The new instruction includes a complex multibit OP code which is formed from sequential keyboard entries which generate a plurality of less complex multibit OP codes. The respective bits of each of the less complex OP codes are added together by a group of n EXCLUSIVE OR gates, each having two input terminals and an output terminal. The output bits from the keyboard forming the less complex OP codes are each coupled to a first input terminal of a respective one of the n EXCLUSIVE OR gates and the outputs of the OR gates are coupled to respective ones of n parallel in inputs of the storage register means. Second inputs of the *n* EXCLUSIVE OR gates are respectively coupled to n parallel out outputs of the storage register means by separate channels. In operation, the bits of a first input OP code generated by the keyboard is stored in the storage means. Upon generation of a second input OP code by the keyboard the bits of the second OP code at the first inputs of the EXCLUSIVE OR gates are added to the bits of the first OP code at the second inputs of the EXCLUSIVE OR gates by the EXCLUSIVE OR gates to form a complex OP code which is then stored in the storage register means. Further, less complex OP codes may be added to the contents of the storage register means by further keyboard entries. When the desired complex OP code is finally formed and stored in the storage register means, it is transferred to the read/write memory at the location selected by the address counter. As in the described embodiment, where the storage register means is a shift register, the transfer may be accomplished serially. This system therefore greatly reduces the number of unique keys required to form a larger number of unique OP codes.

In a further aspect, multikey keyboard means is connected to generate each OP code and actuates the clock to load the shift register.

In a further aspect, a decoder and display means is provided coupled to the parallel out outputs of the storage register means whereby the complex OP code in the storage register means is visually displayed. Detected erroneous OP codes are deleted by rekeying the keys which built the erroneous OP code.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF PREFERRED EMBODIMENT

The present invention is directed to manual forming of complex OP codes in a reversible manner.

FIGURE 1

Figures 1, 2:
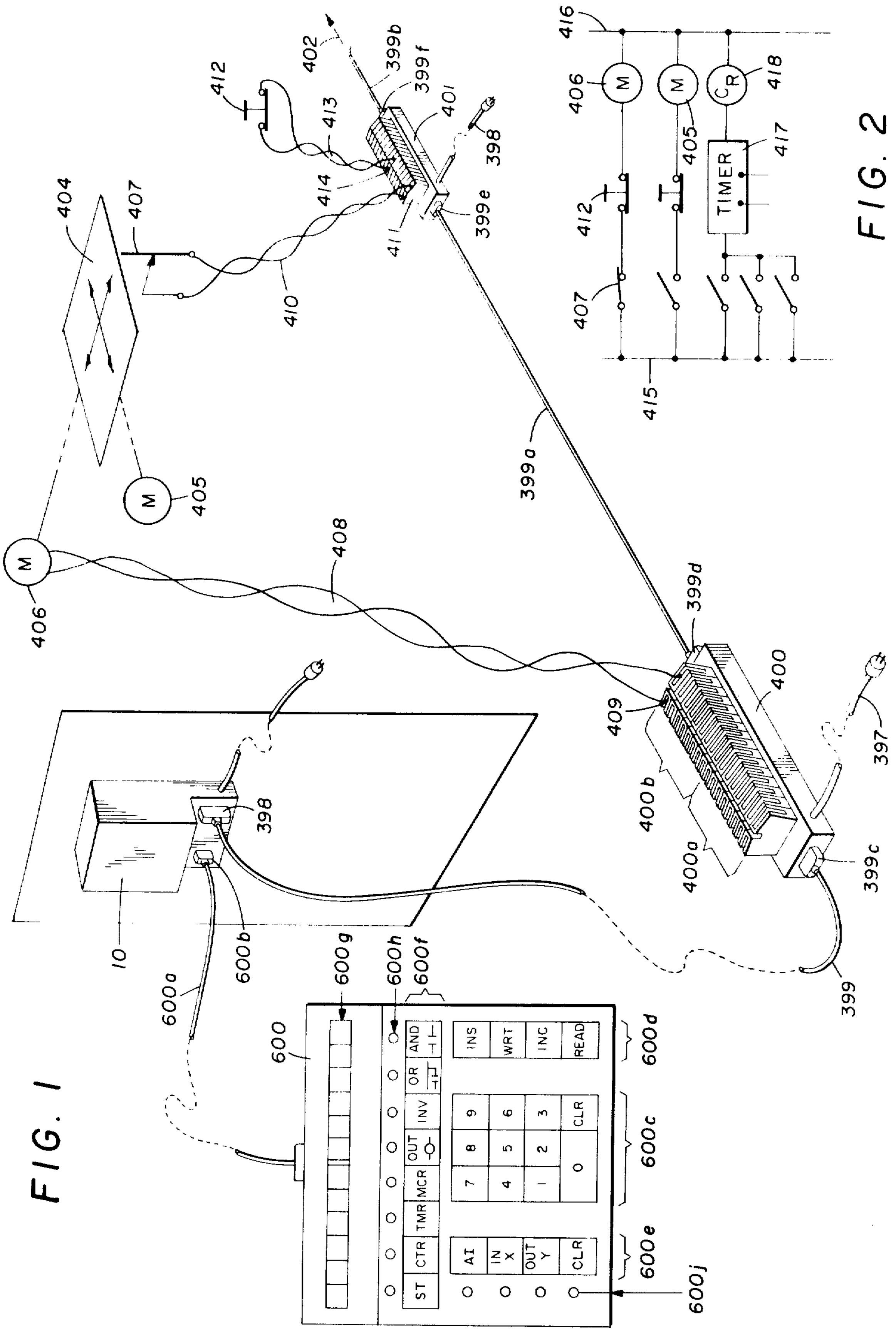
FIG. 1 illustrates a programmable timer installation.
FIG. 2 illustrates a typical ladder network representing the system of FIG. 1.

FIG. 1 illustrates a programmable logic controller 10 connected by way of a plug 398 and a multiconductor cable 399 to an I/O base unit 400 and thence by cable **399*a* to an I/O base unit 401 with a cable 399*b* extending in the direction of arrow 402 to additional I/O units that may be located at any desired points. The programmable controller 10 is a hard wired self-contained process sequencer and controller which is programmed from a plug-in input unit 600. Unit 600 is connected by way of cable 600*a* through a plug 600*b* to unit 10. OP codes are entered on unit 600.**

The I/O base 400 has a plurality of I/O connectors such as connector 409 to accomodate different circuit elements. I/O base 401 also has a plurality of I/O connectors such as connectors 411 and 414. The connectors are used, for example, in the control of an X/Y table 404. A motor 405 drives table 404 along one axis. A motor 406 drives table 404 along another axis. A limit switch 407 is positioned to be actuated when physically engaged by table 404. Motor 406 is connected by conductors 408 to output connector 409 on the I/O base 400. Switch 407 is connected by conductors 410 to input connector 411 on I/O base 401. A push-button switch 412 is connected by conductors 413 to input connector 414 on base 401.

Programmable controller 10 is used, for example, to energize motor 406 only when both switches 407 and 412 are closed. Such action would be in response to control states stored in a memory in unit 10. The memory in unit 10 may be loaded with the desired control states by way of the input unit 600. The complexity of each OP code will depend upon the complexity of the ladder diagram defining the relationship between the elements.

I/O base 400 in this example provides eight input connectors 400a and eight output connectors 400b. Similarly, I/O base 401 provides eight input connectors 401a and eight output connectors 401b.

FIGURE 2

The system operates in response to instruction voltage states loaded in the language of ladder networks normally employed in the wiring of power control systems. For example, FIG. 2 illustrates a typical ladder network wherein limit switch 407 and push-button switch 412 are connected in series with motor 406 between power conductors 415 and 416 which are included in power cable 397 leading to base 400, FIG. 1. In a similar manner, motor 405 is connected in series with like control elements between lines 415 and 416. A third circuit connected across lines 415 and 416 may comprise three switches in parallel leading to a timer 417 and a control relay 418 where the timer is operative when any one of the switches connected thereto is closed.

In the embodiment of the invention which is described herein, 256 output elements like element 409, and 256 input elements like elements 411 and 414, may be accommodated. The system illustrated in FIG. 1 provides for storing instructions for implementing many paths in a ladder diagram. The embodiment is expandable to accommodate many more elements included in a system represented by a ladder diagram. This is accomplished by using in a unique manner a nonaddressed push down storage stack for temporary storage of intermediate results of programmed manipulations which will operate equally well with Boolean equations which may be broken into subgroups and each subgroup separately stored in a push down stack and thereafter combined to produce final results of the Boolean relationship. While only simple ladder elements are illustrated in FIG. 2, the system illustrated in FIG. 1 is versatile in that an almost unlimited number of rungs may be accommodated in the ladder network with unlimited number of elements in a given rung or line.

The construction employed for controller 10 and the I/O bases 400 and 401 is described in copending U.S. Pat. application Ser. No. 431,442, referenced above and will not be described here. The control module 600 will now be described. It will be understood that the unit 600 is to be employed only to program a controller. In operation, the plug 600b would be inserted only while a desired ladder network is being entered in to controller 10. Thereafter, plug 600b would be removed and unit 600 would be available for use for programming additional controllers located elsewhere.

PROGRAMMER — FIGURES 1, 1A, 1B and 3–6

Unit 600, FIG. 1, is a small portable keyboard input unit. Four sets of keys are included. The first set, 600c, is an eleven key set having the numerals 0–9 and a CLR (clear) button. The second set, **600*d***, is a four key set identified as INS (insert), WRT (write), INC (increment), and READ.

The third set, **600*e***, is a four key set, three of which are used, namely IN-X, OUT-Y and CR (control relay).

The fourth set, **600*f***, is an eight key set including ST (start or store term), CTR (counter), TMR (timer), MCR (master control relay), OUT (output), INV (invert or not), OR, and AND.

Associated with the keyboard is an array **600*g*** of neon seven segment numerical displays, such as conventionally provided in hand calculators.

Light emitting diodes **600*h* are provided with one such indicator for each of the keys in the set 600*f*. Light emitting diodes 600*j*** are provided, one for each of the keys X, Y, and CR and one for the none key location AI.

Programmer 600, as shown in FIG. 1, serves to provide for operation in any selected one of five different modes. A mode is selected by depressing any one of the four buttons in set **600*d* or the clear (CLR) button of set 600*c*. Depression of the clear button in set 600*c* serves to clear registers and storage units hereinafter identified preparatory to performing any one of the functions in set 600*d***.

In the read mode, any instruction in sequencer memory may be read. This may be done by first entering through the keyboard **600*c* the address in memory of the instruction which is to be read, i.e., from 0 through 255. Depression of the read key thereafter causes the instruction to appear in the display 600*g* and further causes the appropriate LED elements in sets 600h and 600*j*** to be illuminated.

In the increment mode, any address that has been entered into the unit 600 by way of its keyboard and has not been cleared will be incremented by a factor of one upon depression of the INC button and clears the left portion of the display and the OP code command. For example, if the button CLR in set **600*c* is depressed, followed by depressing the INC button of set 600*d*, the address then effective will be address No. 1, but if the address presented by display 600*g* is 250, it will be incremented to 251**.

Memory addresses effective at a given time are displayed on the right hand four digits of display **600*g***.

In the write mode, any new instruction desired can be written into memory. If an instruction previously was placed in memory at the desired location, the write mode causes the new instruction to be written over the previous instruction.

In the insert function, a new instruction can be inserted at any point in memory with every subsequent instruction stored in memory being shifted one memory location higher upon depression of the INS button. For example in terms of the ladder diagram of FIG. 2, if the ladder rung including motor 405 occupied memory locations 100, 101 and 102 and it is desired to insert into memory beginning at location 100 the rung including motor 406, then the following operations would be carried out, using programmer 600.

Step 1: depress clear button

Step 2: enter the address, i.e., depress buttons 100.

Step 3: depress ST (start-store) and X (in) buttons.

Step 4: since switch 407 occupies the I/O address No. 9, depress numeral 9 of set 600c.

Step 5: depress INS button (insert) of set 600d. This establishes in memory location 100 the switch 407.

Step 6: depress button INC.

Step 7: depress button AND of set 600f.

Step 8: depress key X of set 600e.

Step 9: since switch 412 occupies I/O address 16, depress keys 1 and 6 of set 600c.

Step 10: depress key INS of set 600d.

This completes insertion of element 412 into memory location 101 together with its relation to switch 407.

Step 11: depress button INC of set 600d.

Step 12: depress button OUT of set 600f.

Step 13: depress button Y of set 600e.

Step 14: since motor 406 occupies I/O address 8, depress numeral 8 of set 600c.

Step 15: depress button INS of set 600d.

This completes entry of the motor 406 into memory location 102 together with its relation to switches 407 and 412.

Figure 1A:
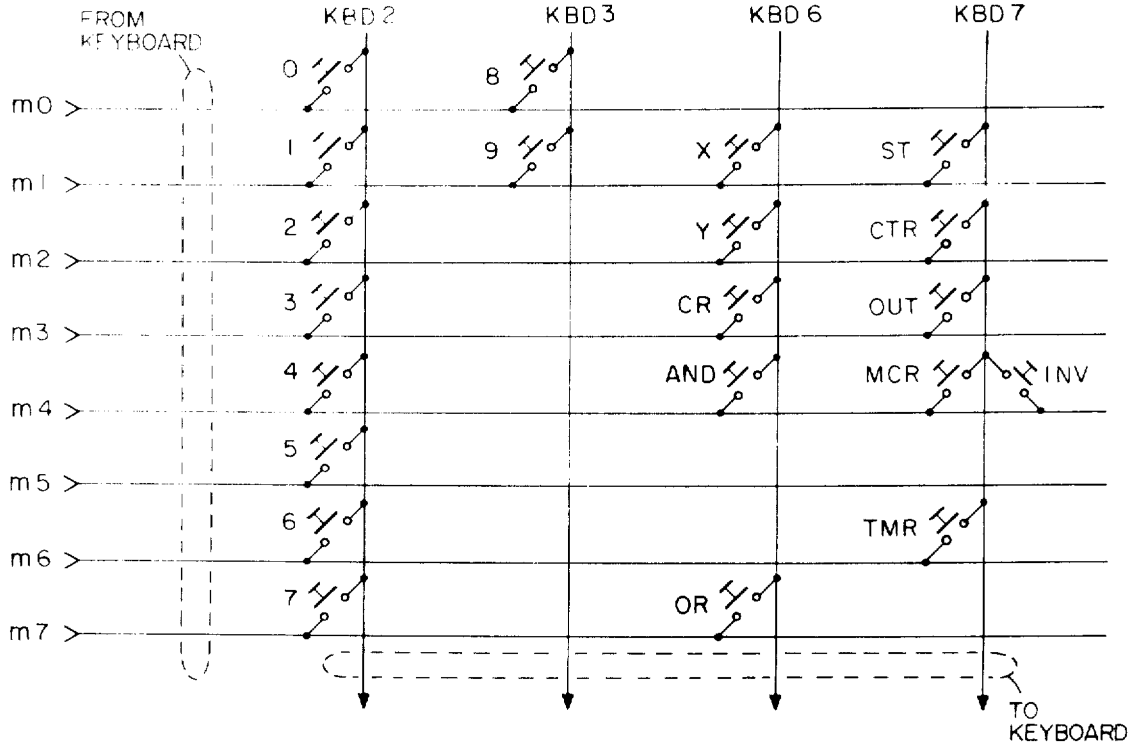
FIGS. 1A and 1B illustrate the keyboard switching matrix of FIG. 1.
Figure 1B:
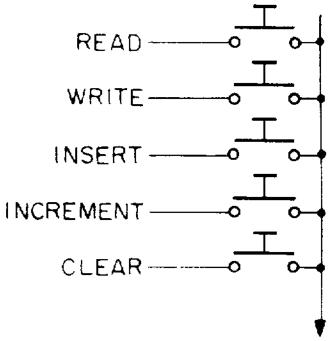

The elements of the second rung previously occupied memory addresses 100, 101 and 102. Entry of switch 407 into memory shifts all elements in memory up one memory address. The same is true upon insertion of the switch 412 and upon insertion of the motor 406. Thus, the elements of the rung involving motor 405 occupy new memory locations 103, 104 and 105. The push buttons illustrated in FIG. 1 actuate switches connected in the circuit arrangement illustrated in FIGS. 1A and 1B. In FIG. 1A, eight lines, $\overline{M0}$-$\overline{M7}$, lead to the keyboard. Four lines KBD2, KBD3, KBD6 and KBD7 lead from the keyboard. The push button switches are connected in the resulting matrix to provide coded outputs on the four lines leading from the keyboard. All of the switches in set 600c (except switch CLR), set 600e and set 600f are involved in the x-y matrix of FIG. 1A as indicated by the legends therein. Depression of the zero switch on keyboard 600c, FIG. 1, established continuity between line MO and line KBD2 of FIG. 1A. It will be noted that the switches MCR and INV provide the same function, i.e., the closure of each causes continuity to be established between input line M4 and output line KBD7.

In FIG. 7, unit 600 has lines $\overline{M0}$-$\overline{M7}$ which lead to the keyboard in the manner illustrated in FIG. 1A. The lines KBD2 and KBD3, FIG. 6, and lines KBD6 and KBD7, FIG. 9, lead from the keyboard.

The circuit of FIGS. 7–10 includes two primary data loops responsive to commands entered by way of the keyboard. The two data loops will first be generally described before discussing further the utilization of the keyboard arrangement of FIGS. 1, 1A and 1B.

Figure 3:
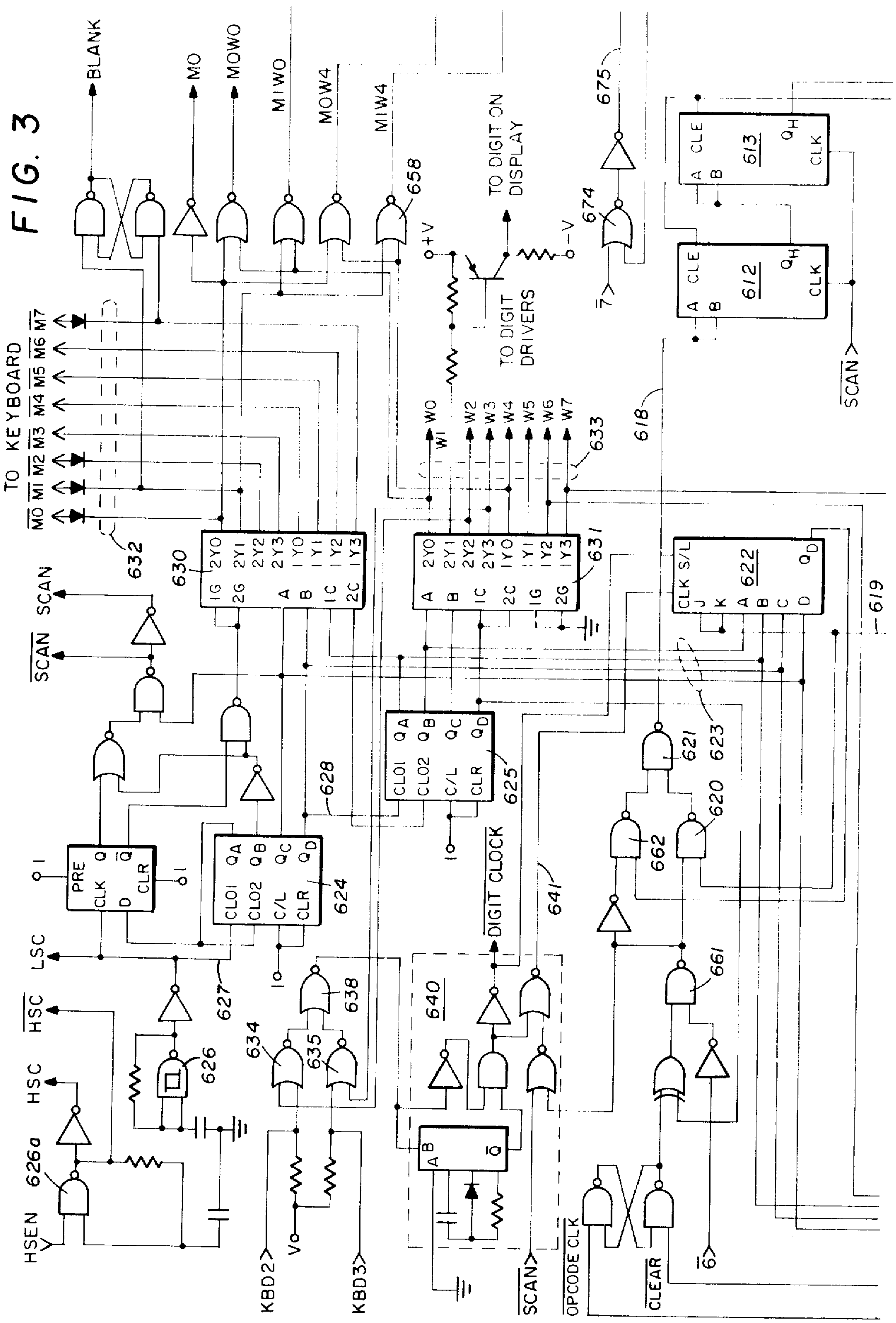
FIGS. 3–6 illustrate details of a programming unit.
Figure 4:
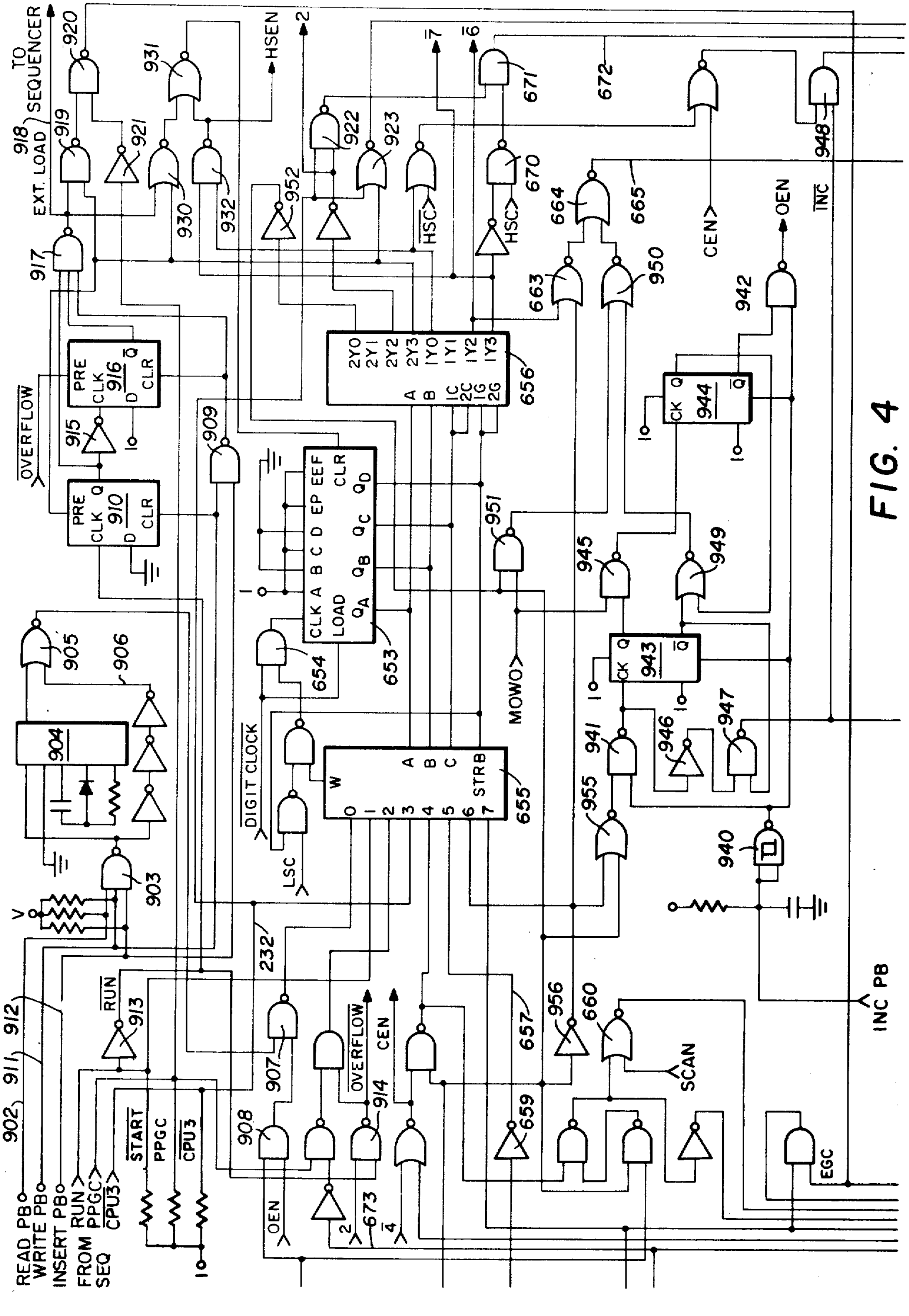
Figure 5:
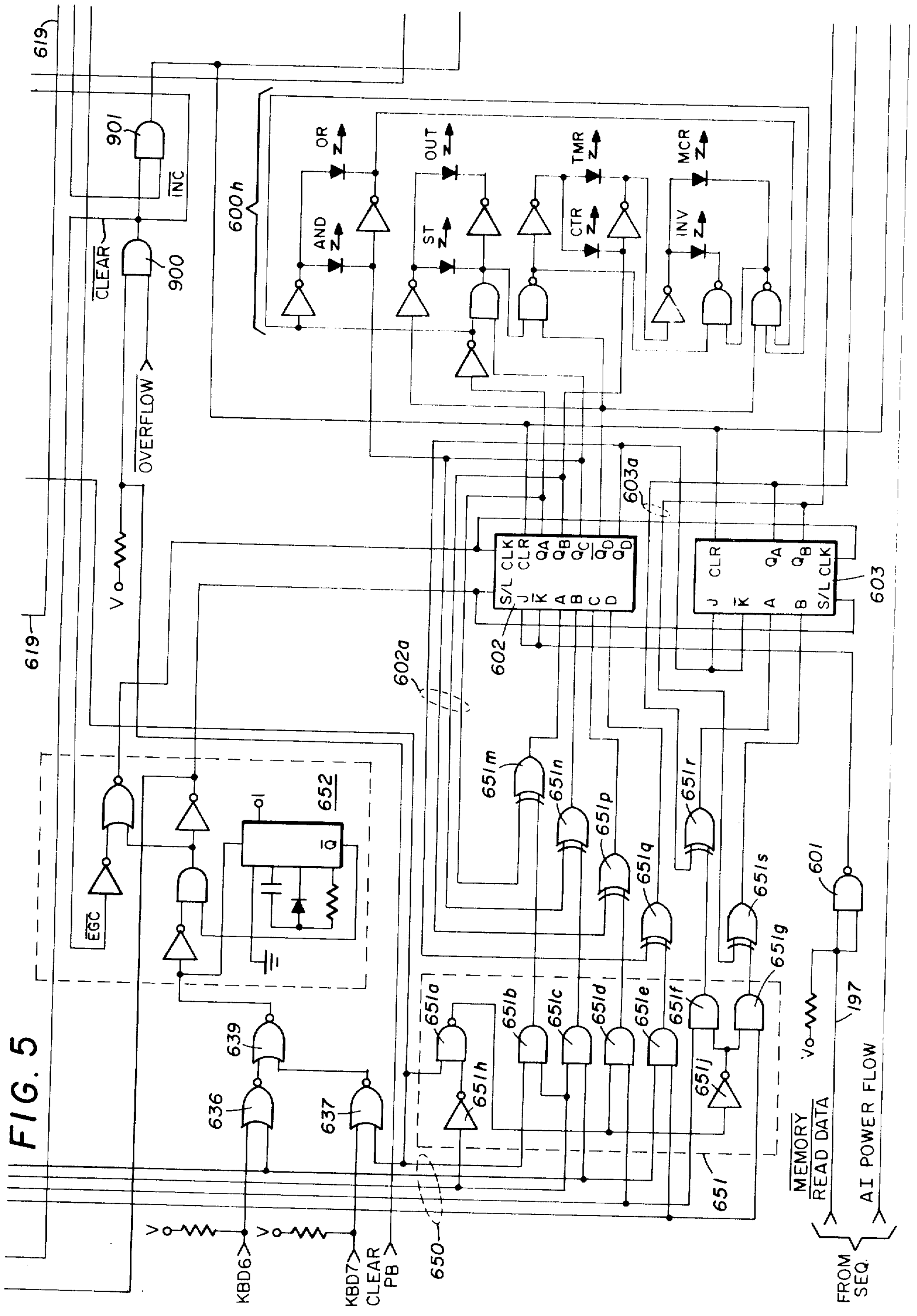
Figure 6:
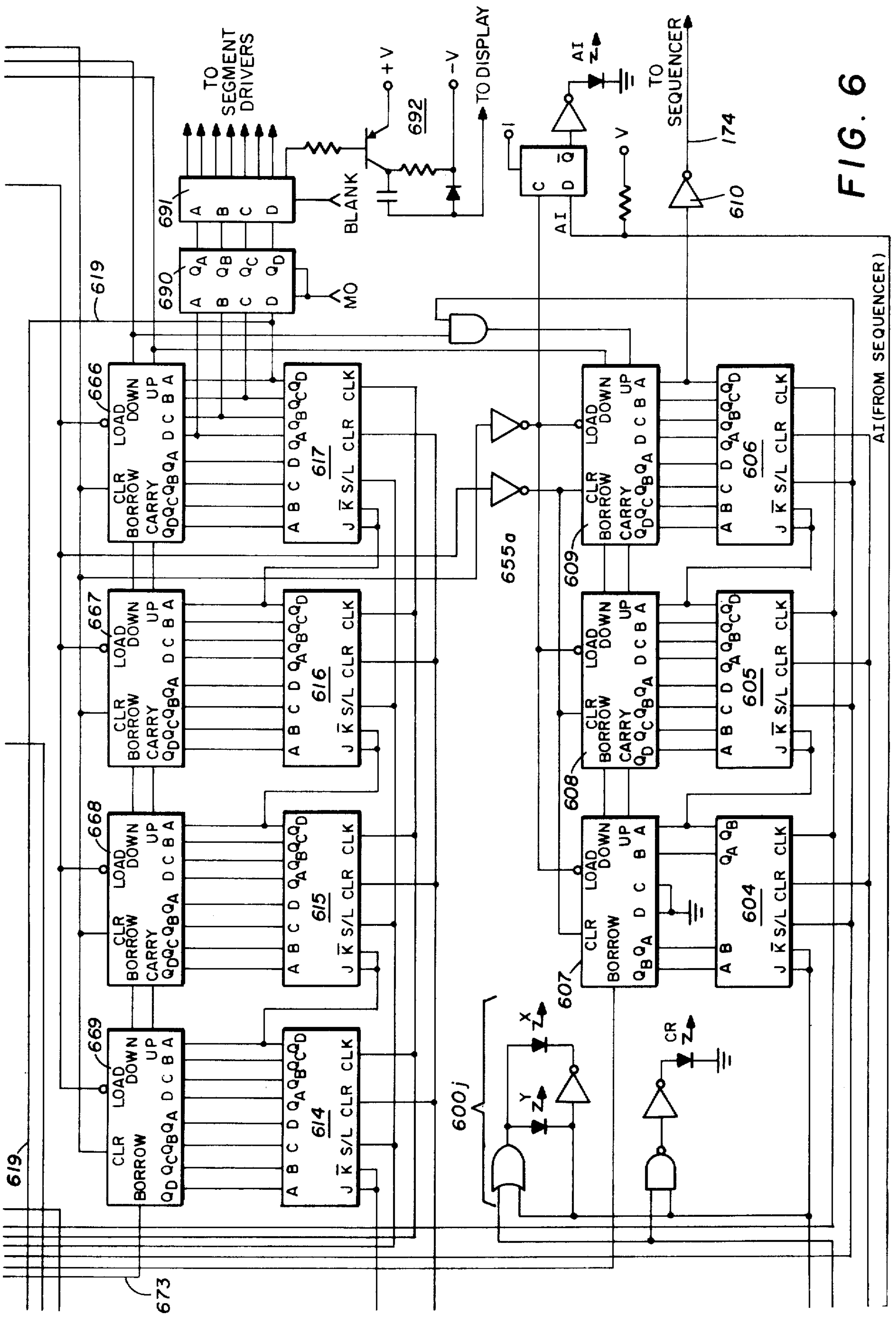

The first data loop leads from the sequencer 10, FIGS. 3 and 4, through a Schmitt trigger 601, FIG. 9, and includes shift registers 602–606, FIGS. 9 and 10. Operating with the shift registers 604–606 are binary up/down counters 607–609, respectively.

The output of the first data loop passes by way of inverter 610 to line 174 which leads back to sequencer 10. Any signals or data type information that is to be transmitted from unit 600 to sequencer 10 must pass through the shift registers 604–606 and thence to line 174.

The second loop is a binary coded decimal (BCD) loop. It is a numeric data loop accommodating thirty-two bits. A first sixteen bits are stored in shift registers 612 and 613, FIG. 7. The second sixteen bits are stored in shift registers 614–617, FIG. 10. The loop through which the data flows includes the input line 618 connected to the A and B (NAND) input terminals of shift register 612. The data bits are clocked sequentially through register 612–617 and thence by way of the output line 619, NAND gate 620 and NAND gate 621 back to line 618.

Numeric data entered from the keyboard in unit 600 is placed into the loop 612–621 by way of a shift register 622. Four lines 623 lead to shift register 622. The states on line 623 are controlled by counters 624 and 625 as driven by a low speed clock (LSC) oscillator 626. Clock 626 is free running relative to clock 50 of sequencer 10. A second oscillator is provided along with oscillator 626. The second is a high speed clock (HSC) oscillator 626a. They operate at frequencies of about 180 kilohertz and 1.8 megahertz, respectively.

Oscillator (LSC) output line 627 leads to the clock input terminal of counter 624. The QD output terminal of counter 624 is connected by way of line 628 to the clock input terminal of counter 625. Counters 624 and 625 operate in conjunction with decoders 630 and 631 such that the outputs of decoders 630 scan the switches in the keyboard. Output states on lines 633 leading from decoder 631 strobe display 600g and strobe the outputs of the keyboard, i.e., output lines W2, W3, W6 and W7. Lines labeled $\overline{M0}$-$\overline{M7}$ of FIG. 1A correspond with lines 632 of FIG. 7.

Line KBD2 from the keyboard leads to a NOR gate 634, the second input of which is the line W2 from the set 633. Similarly, keyboard line KBD3 leads to a NOR gate 635, the second input of which is line W3. Line KBD6 leads to a NOR gate 636, the second input of which is line W6. The line KBD7 leads to NOR gate 637, the second input of which is line W7. Gates 634 and 635 supply the inputs to a NOR gate 638. Gates 636 and 637 supply the inputs to a NOR gate 639. The output of gate 638 is connected through a single pulse circuit 640 to produce on output line 641 a digit clock pulse which is applied to the clock input terminal of register 622 to load into register 622 the code on lines 623 representing the numeric key on the keyboard that had been depressed. Pulses from clock oscillator 626 as provided by counter 624 through decoder 630 provide a keyboard strobing sequence. Line MO goes low initially, followed by lines M1 . . . M7 following which the line M0 goes low again and the cycle is repeated. Gating into register 622 of the code on lines 623 is controlled by depressing a key on the keyboard. The particular code on lines 623 is the one that happens to be present at the instant of time that a particular pulse occurs in response to pressing a given key. The keyboard operation thus far described is essentially the same as in calculators manufactured and sold by Texas Instruments Incorporated of Dallas, Texas and identified as TI2500 Pocket Calculator.

Thus, actuation of any of keys 0–9 in set 600c will cause to be loaded into register 622 a binary code representative of the selected numeral 0–9.

The selected numeral in register 622 may then be inserted into the BCD loop and ultimately transferred into registers 604–606. The data placed in registers 604–606, except in a few cases which will hereinafter be discussed, is the I/O address of a given connector element located along cable 399. It will be recalled that there are, in the embodiment described, 256 input addresses and 256 output addresses along cable 399. In unit 400 the first eight units 400a are input units, the second eight units 400b are output units. As above described, the I/O address designates the location of such a connector unit as is employed to connect to motor 406, to switch 407, to switch 412, etc.

The programming unit 600 serves to encode selected OP codes which are entered by actuating switches in the set 600*f*. Unit 600 also permits identifying desired I/O address modifiers by actuating one of the keys in set 600*e*.

The circuit operates to store the OP codes in register 602 and to store the I/O address modifiers in register 603. The circuitry associated with registers 602 and 603 permits manual insertion of a desired OP code or multiple OP codes and removal of one or all of the OP codes that have been inserted in order to give an operator flexibility in entering a given set of data representing a ladder network or modifying a set of data that has previously been loaded in the system. More particularly, actuation of a key to energize either lines KBD6 or KBD7 will cause data on lines 650 to be decoded for loading into registers 602 and 603. The logic circuits within the dotted outline 651 serve to decode data from lines 650 into binary form for storage in registers 602 and 603. The code stored in such registers is representative of the OP codes designated in FIGS. 1, 1A and 1B and associated with lines KBD6 and KBD7. The states appearing at the outputs of the gates in unit 651 are set out in Table I.

TABLE I

| Key | 651b | 651c | 651d | 651e | 651f | 651g |
|---|---|---|---|---|---|---|
| X | 0 | 0 | 0 | 0 | 0 | 1 |
| Y | 0 | 0 | 0 | 0 | 1 | 0 |
| CR | 0 | 0 | 0 | 0 | 1 | 1 |
| AND | 1 | 0 | 0 | 0 | 0 | 0 |
| OR | 1 | 0 | 1 | 0 | 0 | 0 |
| ST | 0 | 0 | 0 | 1 | 0 | 0 |
| CTR | 0 | 0 | 1 | 0 | 0 | 0 |
| OUT | 0 | 0 | 1 | 1 | 0 | 0 |
| MCR | 0 | 1 | 0 | 0 | 0 | 0 |
| INV | 0 | 1 | 0 | 0 | 0 | 0 |
| TMR | 0 | 1 | 1 | 0 | 0 | 0 |

Output states of Table I are generated as follows. Line W7 from set 633 is connected to one input of NAND gate 651a and to one terminal of AND gate 651b. The line W6 from set 633 is connected to one input of AND gate 651c and to one input of AND gate 651e. The three least significant bit lines of line 623 are then connected to the circuit 651. More particularly, the QA output of counter 625 is connected through an inverter 651*h* to the second input of NAND gate 651*a* and to the second input of AND gate 651*c*. The QD output of counter 624 is connected to the second input of AND gate 651d and to one input of AND gate 651*f*. The output of NAND gate 651*a* is connected to a second input of AND gate 651*d* and by way of inverter 651*j* to inputs to each of AND gates 651*f* and 651*g*.

The QC output of counter 624 is connected to the second input of AND gate 651*e* and to the second input of AND gate 651*g*.

The outputs of AND gates 651*b*–651*g* are connected to one input of exclusive OR gates 651*m*–651*s*, respectively. The QA-QD outputs of shift register 602 supply the second inputs of exclusive OR gates 651*m*–651*q*, respectively. The QA and QB outputs of shift register 603 supply the second inputs of exclusive OR gates 651*r* and 651*s*, respectively.

The data stored in shift register 602 is the OP code. There are 16 OP codes employed in the present example. Such OP codes are set out in Table II.

TABLE II

| OP CODE | OUTPUT 651m | 651n | 651p | 651q |
|---|---|---|---|---|
| JUMP | 0 | 0 | 0 | 0 |
| ST (LOAD) | 0 | 0 | 0 | 1 |
| CTR | 0 | 0 | 1 | 0 |
| OUT | 0 | 0 | 1 | 1 |
| MCR/INVERT | 0 | 1 | 0 | 0 |
| ST INVERT (LOAD) | 0 | 1 | 0 | 1 |
| TMR | 0 | 1 | 1 | 0 |
| OUT INVERT | 0 | 1 | 1 | 1 |
| AND | 1 | 0 | 0 | 0 |
| AND ST | 1 | 0 | 0 | 1 |
| OR | 1 | 0 | 1 | 0 |
| OR ST | 1 | 0 | 1 | 1 |
| AND INVERT | 1 | 1 | 0 | 0 |
| AND ST INVERT | 1 | 1 | 0 | 1 |
| OR INVERT | 1 | 1 | 1 | 0 |
| OR ST INVERT | 1 | 1 | 1 | 1 |

The data stored in shift register 603 is the I/O address modifier. There are three modifiers employed herein, as set out in Table III.

TABLE III

| Key | 651r | 651s |
|---|---|---|
| X | 0 | 1 |
| Y | 1 | 0 |
| CR | 1 | 1 |

All of the OP codes set out in Table II are selectable by actuation of keys in set 600*f*, FIG. 1. Some of the OP codes, it will be noted, involve entries made by depressing two of the keys in set 600*f* and some by depressing three of the keys.

From an inspection of the circuit involving the exclusive OR gates 651*m*–651*q*, it will be seen that any OP code which appears at the output of unit 651 will be entered into register 602 if register 602 is clear. However, if the same OP code button is depressed a second time, then the feedback by way of channel 602*a* will cause the OP codes previously entered into register 602 to be erased. The circuit thus provides for a selected bit-by-bit entry into register 602 and bit-by-bit erasure thereof without otherwise modifying the operation of the programming unit 600 in any way. For example, referring to FIG. 1, assume an operator attempted to insert switch 412 and erroneously depressed the OR button in step 7 of the sequence above described in the previously given example rather than the AND button. If the operator then recognized the error and desired to correct the same, the correction could merely be made by depressing the OR button again followed by depression of the AND button. The sequence of operations would change the code in register 602 from 1,010 to 1,000. Thus the selective insertion and removal of a single bit to change the code. Use of the exclusive OR gates 651m–651q provides this unique sequence of operation, i.e., alternately entering and erasing a given code from register 602 upon repeated insertions of the same input command.

The same is true of the three lines leading to gates 651*f* and 651*g* of unit 651. They operate through exclusive OR gates 651*r* and 651s to control the LED displays 600j. At the same time, lines 603*a* are fed back to exclusive OR gates 651*r* and 651*s* for the selected control of the data in register 603.

The outputs of the shift register 602, in addition to being connected back to the exclusive OR gates 651*m*–651*q*, are also employed for controlling a light emitting diode display 600h. From the circuit shown, it will be seen that when a given button in the set 600f is depressed, the corresponding light emitting diode in display 600h will be illuminated. The diodes in set 600h, FIG. 9, bear the same legends as do the associated keys in the set 600f, FIG. 1. In a similar manner, the light emitting diodes labeled X, Y and CR of display 600j, shown in FIG. 10, are controlled by the QA and QB outputs of shift register 603.

The logic circuit 652 operates the same as the circuit 640 for controlled loading of registers 602 and 603.

It will be noted that a DIGIT CLOCK line is one of the outputs from circuit 640. This signals the fact that a digit code has been stored in register 622 and is to be inserted into the data loop that is being clocked through registers 612-617. This action is initiated by application of the $\overline{\text{DIGIT CLOCK}}$ signal to the load terminal of a state counter 653 and, through AND gate 654, to the clock input terminal of counter 653. Counter 653 is prewired so that it is forced to the count of five. The output lines QA–QD of counter 653 are connected to terminals A, B, C and STRB of a data selector unit 655 and to input lines of a decoder 656. Since the output from counter 653 is preset to five, the data selector 655 selects the signal on line 657 leading from NOR gate 658 by way of an inverter 659.

A 32 bit word circulates in the second loop including shift registers 612-617. It continuously is shifted by SCAN clock pulses. Scan clock pulses are applied to the clock inputs of shift registers 612 and 613, and by way of NOR gate 660 to the clock input terminals of shift registers 614–617.

When a four bit word is stored in shift register 622, the object is to insert that word into the appropriate location in the 32 bit word already circulating in shift registers 612–617. The operation of the bit counter 653 and the data selector 655 in connection with decoder 656 causes a delay until the appropriate time for insertion arrives. This is caused by a delay interval during state 5 of data selector 655. Upon the occurrence of state 6 of data selector 656, the NAND gate 661 is enabled so that the output line QD from register 622, leading to NAND gate 662, will cause the word stored in register 622 to be inserted into the input of storage register 612. Data on line 619 then passes through register 622 trailing the word inserted into the loop from register 622. Thus, register 622 is included within the second data loop for sixteen bits. During the state 6 from decoder 656, a NOR gate 663 is enabled. This causes signal MOW4 to be present. This generates through NOR gate 664 a load state on line 665 which leads to the load input terminals of binary coded decimal up/down counters 666–669. Counters 666–669 are connected to the shift registers 617–614, respectively. Line 665 also extends to the CLEAR terminals of binary counters 607–609 by way of inverter 655*a*.

Thus, the sixteen bit data word is loaded in shift registers 666–669 and is to be converted to a binary counterpart which will be generated in counters 609–607. On state 7 of decoder 656 a high speed clock HSC applied by NAND gate 670 in conjunction with state 7 from decoder 656 enables AND gate 671 which is operated in an OR function so that HSC pulses then appear on clock line 672. Line 672 is then connected to the down input terminal of counter 666 and to the up input terminal of counter 609. Counters 666–669 then count down to zero. During the same interval, counters 609–607 count up. At the instant that the counter 669 reaches zero count, a borrow signal appears on line 673 and is applied to NOR gate 674 which effectively is ANDed with state 7, thereby to apply by way of line 675 a load pulse to each of the load terminals of registers 604–606. At the instant of the borrow pulse, the contents of counters 607–609 are immediately captured in storage registers 604–606 and are thus available for reading out over line 611 to the sequencer.

In operation, the sequencer shown in FIG. 1 once set in operation will repeat wait-serial I/O-run modes following each peak in the a.c. power.

When programmer 600 is connected to the system and is to be used, the operation of the sequencer normally will continue uninterrupted. However, when the programmer of FIGS. 3–6 is placed in the read mode, the memory address specified by the operator is placed in counters 666-669. The counters then count down to zero. Upon reaching zero, the channels from NAND gate 601 and specifically, the enable terminals on registers 602, 603, 604, 605 and 606 are energized so that the words stored in memory at the location at the address initially specified in counters 666–669 will be brought out and stored in shift registers 602-606. Immediately, the LED displays 600h and 600j will be energized to display the contents of registers 602 and 603. The contents of registers 604–606 comprise the I/O address stored in the main memory location specified by the user. The I/O address thus contained in registers 604–606 is then loaded into counters 607–609. Counters 607–609 then count down to zero as counters 666–669 count up. When counters 607–609 reach zero, counters 666–669 stop counting. The output of the counters is then applied to the shift registers 614–617. The outputs thereof are then displayed. More particularly, the I/O address comprises sixteen bits of the thirty-two b bits circulating in the BCD loop. Each set of four of the sixteen bits is latched by latch 690 whose output is applied to a decoder 691. The decoder 691 then is connected selectively to energize the segment drivers. One such segment driver is represented by the circuit 692. The sixteen bits are thus employed to light up the left hand four digits on display 600g. The right hand four digits are decoded to display on the right hand four digits the memory address.

In the insert mode, an operator enters the desired data as above indicated. The OP code is stored in register 602. The modifier data is stored in shift register 603. The I/O address is entered into the BCD loop. The data is then transferred to the shift registers 604–606. In the run mode when the selected address is reached, the data from memory begins to flow to register 602 as data from register 606 begins to flow to memory. The data in memory is then passed as a serial stream through registers 602–606 until all the memory addresses have been read and rewritten in memory displaced by one memory address.

Entry of the numeric data, the entry of the OP codes and the entry of the I/O address modifiers has been described. Now to be described are the operations involving the entry of the five programmer mode commands, CLEAR, READ, WRITE, INSERT and INCREMENT. The CLEAR push button of FIG. 1, when depressed, connects the CLEAR PB line of FIG. 9 to ground. This line is connected to an AND gate 900, the output of which is $\overline{\text{CLEAR}}$ signal. The output is also connected to an AND gate 901 and to the CLEAR terminals of registers 612 and 613. The output of gate 901 is connected to the CLEAR terminals of registers 602-606 and to the CLEAR terminals of registers 614–617.

When the READ button is depressed, line 902 is connected to ground. Line 902 leads to a NAND gate 903, the output of which is connected to a multivibrator 904 which is employed to prevent multiple entries of a single intended entry. More particularly, depression of a push button may close its switch several times. The circuit involving flip-flop 904 is a debouncing circuit having the output as a NOR gate 905. A line 906 serves to delay the signal thereby causing it to pass through gate 905 not before the multivibrator 904 has completed its cycle. The output of gate 905 is then supplied to one input of a NAND gate 907, the output of which is connected to the input terminal 0 of multiplexer 655. Second input of gate 907 is supplied by AND gate 908 which has as its inputs the M1W0 line from FIG. 7 and the OEN signal.

The INSERT push button and the WRITE push button also are connected to gate 903 and thus lead by way of gate 907 to the input 0 of multiplexer 655. The WRITE push button in addition to being connected to gate 903 is connected to a gate 909 and to the CLEAR input terminal of a D-type flip-flop 910 by way of line 911. The WRITE push button is connected to gate 903 and to gate 909.

Three lines, RUN, PPGC and CPU3, are connected to the programming panel 600 from the sequencer of FIG. 1. The RUN line is connected by way of inverter 913 to the clock input terminal of the D flip-flop 910 and to a gate 914. The Q output of flip-flop 910 is connected by way of inverter 915 to the clock input terminal of a B flip-flop 916. The output of gate 909 is connected to a CLEAR terminal of flip-flop 916 and to one input of a NAND gate 917. The output of NAND gate 917 is connected to an external load line 918 that leads to the sequencer. It is also connected through NAND gates 919 and 920.

The PPGC line from sequencer 10 is connected by way of inverter 921 to one input of gate 920.

The $\overline{\text{CPU3}}$ line, as previously described, is connected by way of line 232 through input 3 of multiplexer 655. It is also connected to NAND gate 922 and NOR gate 923. The $\overline{Q}$ output of the flip-flop 916 is connected as a second input to NAND gate 917. The Q output of the flip-flop 910 is connected as the third input to NAND gate 917.

The output of NAND gate 917 is a key signal in communication between the sequencer 10 and the programmer 600. More particularly, the state on line 918 controls whether or not the sequencer 10 will receive data from the programmer 600 which may appear on line 174. In the READ mode, line 918 stays high at all times.

In the WRITE mode, the state on line 918 is low only for that interval of time during which a single word of 16 bits is read from registers 602–606 over line 174 to sequencer 10.

In the INSERT mode, line 918 is high until counters 666–669 reach a count following a START signal corresponding to the address in memory at which it is desired to insert a new instruction. At that instant, the line 918 goes low and the data from registers 602–607 flows over line 174 to sequencer 10 until the end of the cycle is reached, i.e., until all of the remaining of the instructions from memory have been read through registers 602–606 and back into memory.

When the WRITE button is depressed, the CLEAR line to the flip-flop 910 is low and the CLEAR line to flip-flop 916 is high. Each time that the sequencer begins the RUN mode, the clock terminal of flip-flop 910 is actuated so that the Q output is clocked to the same as the D input, or is made to go low. Thus, when the WRITE button is depressed, the output of flip-flop 910 remains low until the 2Y3 output of the multiplexer 656 goes low. This resets the flip-flop 910, that is, it causes the Q output to go high. When the preset pulse is removed, the Q output again goes low. At this instant, the flip-flop 916 is clocked through inverter 915 so that the $\overline{Q}$ output is in a zero state. The output of gate 917 will go low only if all of the inputs are high. Thus, on the WRITE mode, the output of gate 917 is low only during the interval of time that the preset input to the flip-flop 910, i.e., the 2Y3 output of the multiplexers 656, is low.

The circuit involving flip-flops 910 and 916, NAND gate 909 and the demultiplexer 656 operates in the INSERT mode to keep line 918 low for the interval following which the output of 2Y3 of the multiplexer 656 goes low and until the end of the RUN cycle. The line 918 is connected through a NOR gate 930 and a NOR gate 931 to the CLEAR terminal of counter 653. The second input of gate 930 is the 2Y3 output of multiplexer 656. The second input of NOR gate 931 is supplied by a NAND gate 932. One input of gate 932 is the 1Y3 output of demultiplexer 656. The other input is the 1Y0 output of demultiplexer 656. The circuit involving NAND gate 931 will reset a counter 653 at the end of the 2Y3 state when in the INSERT mode and at the end of the 1Y0 state when in the read or WRITE mode. It will reset counter 653 in response to the 1Y3 state at the end of the numeric entry mode.

When the INC button is depressed, the input to a Schmitt trigger 940 is connected to ground. This initiates the operation of incrementing any address that is then circulating in the BCD loop 612–617. The output of Schmitt trigger 940 is connected to a NAND gate 941 and to a second NAND gate 942 as well as to the CLEAR terminals of D flip-flops 943 and 944. The output of gate 941 is connected to the clock input terminal of flip-flop 943. The Q output of flip-flop 943 is connected by way of gate 945 to the clock input terminal of flip-flop 944. The output of gate 941 is connected by way of inverter 946 and NAND gate 947 to the input of an AND gate 948. The $\overline{Q}$ output of flip-flop 943 is connected to one input of OR gate 949 and to a second input of NAND gate 947. The Q output of gate 944 is connected to the second input of NOR gate 949. The Q output is connected to the second input of NAND gate 942. The output of NOR gate 949 is connected to one input of a NOR gate 950, the second input of which is supplied by way of NAND gate 951 which is driven from the 2Y0 output of multiplexer 656 by way of inverter 952. The second input to gates 945 and 951 is the timing signal MOWO output line from FIG. 3.

In operation it will be remembered that a given address is circulating in the BCD loop 612–617. When it is desired to increment that address by a factor of one, then the INC button is depressed. This removes the CLEAR signal from flip-flops 943 and 944. Through gate 942 the OEN (zero enable) signal is disabled and thus is no longer effective on gate 908. Gate 941 also is enabled. Gate 941 is supplied by way of gate 955 which is supplied by the state 2Y0 multiplexer 656 and, by way of inverter 956 with the MOW4 state from FIG. 3.

If the operation involving multiplexer 655, counter 653 and the multiplexer 656 is in the ZERO state and MOW4 state is created, then the output of gate 941 goes low and then high in response to and conforming with MZOW4. This clocks the flip-flop 943 causing the Q output to go high and the $\overline{Q}$ to go low. This enables gate 945 and disables gate 947. The output of gate 945 then clocks flip-flop 944 when the state MOWO from FIG. 3 is generated. On the first pulse out from gate 941, an output of gate 947 is pulsed low and is applied by way of AND gate 948 to the up count terminal of the counter 666 to increment at that instant the address that was then stored in the registers 666–669. At the same time, the signal is applied by way of AND gate 901 to clear the registers 614–617.

Before the INC button was depressed, the output of gate 942 was enabled so that through 908 the counter system could proceed through its cycle. Then the INC button is depressed, the output of gate 942 is disabled so that the counter system cannot proceed until after the increment operation has been completed. When the MOWO signal is applied to the flip-flop 944, the output of gate 942 is again enabled so that the counter 653 can then proceed with its operation.

In the embodiment above described, various integrated components were employed in the manner indicated. Logic units are indicated by conventional symbols. Other elements employed are identified as set out in Table IV.

TABLE IV

| Unit | |
|---|---|
| Decoders 630, 631 and 656 | Three-eight line decoder, manufactured and sold by Texas Instruments Incorporated, Dallas, Texas and identified by SN 74155N |
| Shift registers 612 and 613 | Eight bit shift register, manufactured and sold by Texas Instruments Incorporated and identified by SN 74164N |
| Counters 624, 625 | Counter manufactured and sold by Texas Instruments Incorporated and identified by SN 74177N |
| Shift registers 602–606, 614–617 and 622 | Shift register manufactured and sold by Texas Instruments Incorporated and identified by SN 74195N |
| Up/down counters 607–609 | Binary up/down counters manufactured and sold by Texas Instruments Incorporated and identified by SN 74193N |
| Up/down counters 666–668 | Decode up/down counters manufactured and sold by Texas Instruments Incorporated and identified by SN 74192N |
| Latch 690 | Four bit latch manufactured and sold by Texas Instruments Incorporated and identified by SN 7475N |
| Decoder 691 | BCD to seven segment decoder manufactured and sold by Texas Instruments Incorporated and identified by SN 7448N |
| Counter 653 | Binary four bit counter manufactured and sold by Texas Instruments Incorporated and identified by SN 74163N |
| Counter 655 | Eight to one line demultiplexer manufactured and sold by Texas Instruments Incorporated and identified by SN 74151N |

Having described the invention in connection with certain specific embodiments thereof, it is to be understood that further modifications may now suggest themselves to those skilled in the art and it is intended to cover such modifications as fall within the scope of the appended claims.

What is claimed is:

1. In a computing system which operates according to complex n bit OP codes, a system for building such complex OP codes from sequential inputs of less complex n bit OP codes comprising:

a. an n bit parallel-in, parallel-out storage register means having an n bit input and an n bit output;

b. an input source for generating the n bits of said less complex OP codes in parallel;

c. *n* EXCLUSIVE OR gates each having first and second inputs and an output;

d. first connection means separately coupling each bit of said input source of OP codes to the first input of a respective one of said EXCLUSIVE OR gates;

e. second connection means separately coupling the outputs of said EXCLUSIVE OR gates to respective bits at the input of said storage register means;

f. third connection means separately coupling each output of said storage register means to the second input of a respective one of said EXCLUSIVE OR gates; and g. means coupled to said input source and operable upon generation of each of said less complex n bit OP codes for clocking said storage register means to load the output of said EXCLUSIVE OR gates into said storage register means.

2. The system according to claim 1 wherein said input source includes a multi-key keyboard having a function key for each of said less complex OP codes and an encoder for encoding the output of each of said keys to a distinctive n bit code.

3. The system according to claim 2 wherein said encoder is comprised of scanner means for scanning said function keys and a counter coupled to said scanner means for generating a bit binary count corresponding to an actuated function key.

4. The system according to claim 1 wherein said storage register means is a parallel-in, parallel-out shift register and said system includes means for serially shifting completed complex OP codes out of said shift register.

5. The system according to claim 1 further including a decode circuit coupled to the output of said storage register means for decoding said complex OP codes and generating individual signals indicative of each of said complex OP codes.

6. The system according to claim 5 including visual indicator means coupled to said decode circuit for visually indicating the particular OP code located in said storage register means as indicated by said individual signals.

7. In a controller which computes operation control signals for an external apparatus according to complex n bit OP codes, a system for building said complex OP codes comprising:

a. a multikey keyboard having a function key for each of a plurality of single functions;

b. encoder means for encoding the output of each of said keys to a distinctive n bit OP code corresponding to the single function of the key; and c. code generating means for building complex n bit OP codes representative of multiple functions from sequential inputs of a plurality of said keys, said code generating means including:

i. an n bit storage means having an input and an output for each bit of storage;

ii. n EXCLUSIVE OR gates each having first and second inputs and an output;

iii. first connection means separately coupling each bit of said encoder means to the first input of a respective EXCLUSIVE OR gate;

iv. second connection means separately coupling the outputs of said EXCLUSIVE OR gates to the input of respective bits of said storage means;

v. third connection means separately coupling each output of said storage means to the second input of a respective EXCLUSIVE OR gate; and vi. means coupled to said input source and operable upon generation of each of said less complex n bit OP codes for clocking said storage register means to load the output of said EXCLUSIVE OR gates into said storage register means.

8. The control system according to claim 7 wherein said storage means is an n bit parallel-in, parallel-out shift register and said system includes means for serially shifting completed complex OP codes out of said shift register for storage as a complex multi-function OP code in said controller.

9. The control system according to claim 7 wherein unique keys are provided for each of the single logical functions AND, OR and NOT and wherein said multiple function OP codes generated by said code generating means include the additional logical AND NOT and OR NOT functions.

* * * * *